(12) United States Patent
Tseng

(10) Patent No.: US 6,948,938 B1
(45) Date of Patent: Sep. 27, 2005

(54) PLAYING CARD SYSTEM FOR FOREIGN LANGUAGE LEARNING

(76) Inventor: Yi-Ming Tseng, P.O. Box 19428, Stanford, CA (US) 94309-9428

( * ) Notice: Subject to any disclaimer, the term of this patent is extended or adjusted under 35 U.S.C. 154(b) by 47 days.

(21) Appl. No.: 10/683,416

(22) Filed: Oct. 10, 2003

(51) Int. Cl.⁷ .............................................. G09B 19/22
(52) U.S. Cl. ................... 434/129; 434/157; 434/172; 273/299; 273/302; 273/304
(58) Field of Search ................................ 434/129, 156, 434/157, 159, 167, 171, 172, 311; 273/299–302, 273/307, 308, 304, 303

(56) References Cited

U.S. PATENT DOCUMENTS

| | | | |
|---|---|---|---|
| 631,766 A * | 8/1899 | Holman ...................... | 273/304 |
| 746,750 A * | 12/1903 | Seymour ..................... | 273/304 |
| 1,060,900 A * | 5/1913 | Hobbs ......................... | 273/304 |
| 1,390,659 A * | 9/1921 | Vaughan ...................... | 273/302 |
| 1,599,568 A * | 9/1926 | Koehler ....................... | 273/308 |
| 1,632,681 A * | 6/1927 | Ross ............................ | 273/307 |
| 2,099,611 A * | 11/1937 | Levoy .......................... | 273/299 |
| 2,607,595 A * | 8/1952 | Mathes ........................ | 273/302 |
| 4,219,197 A * | 8/1980 | Acuff ........................... | 273/299 |
| 4,306,725 A * | 12/1981 | Sawyer ........................ | 273/302 |
| 4,801,149 A * | 1/1989 | Alnafissa ..................... | 273/302 |
| 5,141,235 A * | 8/1992 | Hernandez .................. | 273/308 |
| 5,282,632 A * | 2/1994 | Allen et al. .................. | 273/302 |
| 5,524,899 A * | 6/1996 | Haqedorn .................... | 273/299 |
| 5,540,132 A | 7/1996 | Hale | |
| 5,868,393 A * | 2/1999 | Williams ..................... | 273/299 |
| 5,899,698 A * | 5/1999 | Sandlin ....................... | 434/157 |
| 6,588,756 B1 | 7/2003 | Hughes | |
| 6,598,880 B2 * | 7/2003 | Addabbo ..................... | 273/306 |
| 2003/0057649 A1 | 3/2003 | Herman et al. | |
| 2003/0062683 A1 | 4/2003 | Abrams | |
| 2003/0137108 A1 | 7/2003 | Mathews | |
| 2003/0165805 A1 | 9/2003 | Dillhoff | |

FOREIGN PATENT DOCUMENTS

GB      2257286 A  *  1/1993  ............ G09B 1/00

* cited by examiner

*Primary Examiner*—Bena Miller

(57) ABSTRACT

The invention provides a deck of playing cards containing a plurality of suits with at least one language suit, wherein each card includes thereon one or more characters, words, phrases, and/or sentences in that particular language as its primary content. At least one suit may be a picture suit, wherein each card includes thereon pictorial, symbolic, graphical, image, and/or animation representation as its primary content. Each suit is identified by a symbol or icon, which is exactly the same on each card within each suit. Each card within a suit carries at least one different and unique index thereon representing its order within the suit. Each and every card within a suit has exactly one matching card with identical index and identical meaning(s) of content in each other suit. Players learn foreign languages against native language and pictorial presentation on matching cards.

18 Claims, 8 Drawing Sheets

PLAYING CARD SYSTEM FOR FOREIGN LANGUAGE LEARNING

FIELD OF THE INVENTION

The present invention generally relates to a playing card system used for learning a foreign language(s), and more particularly to a versatile deck of cards that replaces conventional suit classifications, such as Spade, Heart, Diamond, and Club with at least one language and graphical/pictorial representation to aid learning of vocabulary, phrases, and sentences in foreign languages.

BACKGROUND OF THE INVENTION

Playing cards have been in existence for many years. Although there are many types of playing cards that are played in many different types of games, the most common type of playing cards consists of 52 cards, divided into four different suits (namely Spades, Hearts, Diamonds and Clubs) as indicated on one side or the face of each card. In the standard deck, each of the four suits consists of 13 cards, numbered either two through ten, or lettered A (Ace), K (King), Q (Queen), or J (Jack), as also indicated on the face of each card. Thus each card will contain on its face a suit indication along with a number or letter indication. The King, Queen, and Jack usually also include some sort of design on the face of the card, and may be referred to as picture cards.

In some cases, the 52 card standard playing deck also contains a number of extra cards, sometimes referred to as jokers, that may have some use or meaning depending on the particular game being played with the deck.

Many different games can be played using a standard 52 card deck. The game being played with the standard deck of cards may include other items, such as game boards, chips, etc., or the game being played may only need the playing card deck itself. Further, the four different suits indicated on the cards may have a particular value depending on the game. Under game rules where one suit, i.e. Spades, has more value than another suit, i.e. Hearts, the seven of Spades may have more value than the seven of Hearts. It is easy to visualize that using the different card quantity and suit values, many different games can be played. In one aspect, the playing card deck can be a virtual system that can be played electronically.

More importantly, some playing cards are designed for educational purposes. By combining learning and/or memorizing new stuff with entertainment makes the game playing educational. Illustrative examples of the new stuff, such as musical notes, mathematic multiplying table, etc. and learning methods include those set forth in the following disclosures.

U.S. Patent Application No. 2003/0137108 published on Jul. 24, 2003, entire contents of which are incorporated herein by reference, discloses an educational entertainment deck of cards comprising of fifty cards with each card containing the outline of a state of the United States and a two-letter abbreviation of the state. The United Stated Educational Cards are for playing educational games, and learning important information about the states of the U.S. In some aspect, a deck of playing cards that contain the outlines of other geographical territories or nations with names can be designed for enhancing geography recognition and learning.

U.S. Patent Application No. 2003/0057649 published on Mar. 27, 2003, entire contents of which are incorporated herein by reference, discloses a word forming game apparatus comprising four identical alphabet letter and joker supplies, each of which is printed in one of four different colors, wherein each letter supply means consists of fifty alphabet letter with certain more frequently used letters provided in plural numbers, plus two joker tiles for a total of 52 tiles printed in each of four colors. The effect of four different colors enhances the playing pleasure and fun.

U.S. Patent Application No. 2003/0062683 published on Apr. 3, 2003, entire contents of which are incorporated herein by reference, discloses a deck of playing cards (52 cards plus 2 optional "jokers" which are generally used as substitutes for lost originals) wherein each card in the four suits (Spades, Hearts, Diamonds and Clubs) includes the distinct indicia thereon plus alphanumeric Ace through Ten plus Jack, Queen and King which by this invention are improved by including in the printing of each card, an individual paragraph of jokes on top of the alphanumeric symbols as a unity. This improvement augments all the traditional uses of playing cards by combining all the ancient uses of decks of playing cards with jokes.

U.S. Patent Application No. 2003/0165805 published on Sep. 4, 2003, entire contents of which are incorporated herein by reference, discloses a method of playing a card game for learning, the method comprising the steps of: providing a deck of cards that includes at least one fact area on every card, the fact area containing information being at least one of a complete factual statement and a complete equation; dealing the cards to players to provide each player a hand and to begin the card game, non-dealt cards forming a stack; reciting at least one fact area on a card during the course of the card game so that the recitation provides an opportunity for learning the information associated with the fact area, and wherein the deck of cards includes four suits comprising hearts, clubs, diamonds, spades, and each suit including cards of rank.

U.S. Pat. No. 5,540,132, entire contents of which are incorporated herein by reference, discloses a method for teaching musical notation to a child. Each note is associated with a distinctly identifiable color, which is in turn associated with an object which naturally occurs in this color. Each object, in turn, is associated with a cartoon character which prominently incorporates an image of the object. Each character is endowed with a distinctly identifiable personality characteristic which enables the child to utilize the cartoon character in an educational activity. These relationships allow the child to apply relatively sophisticated symbolization techniques which are a part of the child's natural developmental process in order to master the musical notation system.

U.S. Pat. No. 6,588,756, entire contents of which are incorporated herein by reference, discloses an apparatus for teaching musical notation to students by playing familiar card games. A deck of playing cards is utilized which contains musical notation and colored suits rather than the typical numbers with named suits. The musical notation symbols are printed in the corners of the cards to allow them to be used in card games. The deck can be used to play a variety of common card games that take advantage of unique musical notation.

None of the aforementioned inventions discloses a deck of playing cards containing a plurality of suits with at least one suit represented by language style, with the possibility of at least one suit represented by picture style, each and every card within a suit having exactly one matching card with identical index and identical meaning(s) of content in each other suit, for learning and memorizing vocabulary, phrases, and sentences in foreign languages against one's native language and pictorial presentation on matching cards through game playing.

SUMMARY OF THE INVENTION

Some aspects of the invention relate to a deck of playing cards containing a plurality of suits with at least one suit represented by language style, all suits in said deck containing the same plurality of cards, each suit being identified by a symbol or icon thereon for its particular style, the style symbol or icon being exactly the same on each card within each suit, each card within a suit carrying at least one different and unique index thereon that represents its order within the suit, each and every card within a suit having exactly one matching card with identical index and identical meaning(s) of content, i.e., meaning(s) of language or other representation, in each other suit, each and every card within a language-style suit including thereon one or more characters, words, phrases, and/or sentences in that particular language as its primary content. In one embodiment, at least one suit is represented by picture style, each card within a picture-style suit including thereon one or more pictures, symbols, figures, graphs, images, and/or animations as its primary content. Admissibly, the style symbols or icons and/or the contents are in different colors for different suits. (An example of suits other than language or picture suits is a real-object suit, wherein each card has a very thin foil of different material, e.g., gold, inserted and exposed, with the card face planarized for smooth game playing.)

The deck of playing cards may comprise 2 to –21 suits. Further, each suit may comprise 13 cards or another plurality of cards. In one embodiment, the deck of playing cards includes at least one "joker" card, the joker card(s) being unique in the deck and not belonging to any suit. In a preferred embodiment, -the language style or styles are selected from a group of languages consisting of English, Chinese, Japanese, French, Germany, Spanish, Italian, Greek, Danish, Dutch, Russian, Portuguese, Korean, Thai, Vietnamese, Indonesian, Hebrew, Arabic, Swedish, and Finnish, wherein the language style represents vocabulary, phrases, and/or sentences as the contents of the cards. The picture style is the corresponding pictorial, symbolical, graphical, image, and/or animation (as in an electronic embodiment) representation of the vocabulary, phrases, and sentences of the language style(s). In a preferred embodiment, the contents are selected from a group of representation comprising or representing vocabulary, phrases, and/or sentences related to academic disciplines, animals, architecture, arts, astrology, astronomy, buildings, businesses, cartoon characters, chemistry, the Chinese zodiac, clothing, conversation, culture, electronics, engineering, entertainment, equipment, facilities, fashion, feelings, festivals, fishes, foods, flowers, fruits, furniture, games, geography, geology, greetings, holidays, horoscope, human body, insects, instruments, jargons, laws and regulations, machines, materials, mathematics, media, military, movies, music, nations, numbers, occupations, people, peoples, physics, planets, plants, politics, relatives and family, religions, shapes, signs, space, sports, symbols, titles, tools, toys, transportation, and weather.

It is one object of the invention to provide a deck of playing cards that includes a "topic" card containing a description of the topic associated with the deck, the card being unique in the deck and not belonging to any suit. It is another object of the invention to provide a deck of playing cards that includes an "information" card containing information related to the language(s) or pictures in the deck, the card being unique in the deck and not belonging to any suit. It is still another object of the invention to provide a deck of playing cards that includes a "summary" card containing a summary of the language(s) or pictures in the deck, the card being unique in the deck and not belonging to any suit.

BRIEF DESCRIPTION OF THE DRAWINGS

Additional objects and features of the present invention will become more apparent and the invention itself will be best understood from the following Detailed Description of the Exemplary Embodiments, when read with reference to the accompanying drawings.

DETAILED DESCRIPTION OF THE EXEMPLARY EMBODIMENTS

Figure 1:
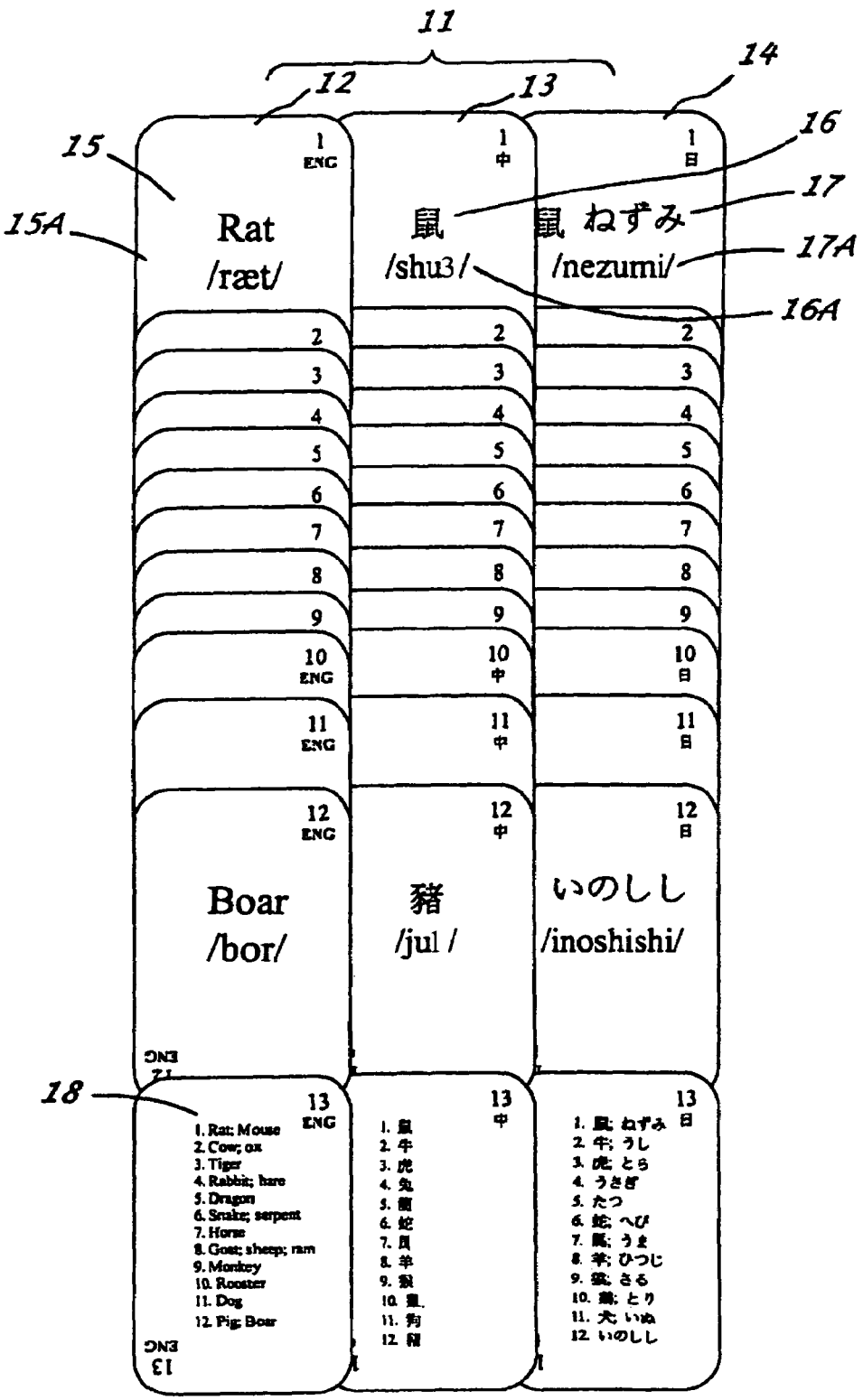
FIG. 1 shows one embodiment of a deck of playing cards with three suits represented by three different language styles: English, Chinese, and Japanese styles.

FIGS. 1–8 show an apparatus comprising a deck of playing cards with a plurality of language suits or at least one language suit plus one graphical/pictorial suit for language learning. While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described below.

In one embodiment, a deck of the cards is associated with one or more topics, e.g., academic disciplines, animals, architecture, arts, astrology, astronomy, buildings, businesses, cartoon characters, chemistry, the Chinese zodiac, clothing, conversation, culture, electronics, engineering, entertainment, equipment, facilities, fashion, feelings, festivals, fishes, foods, flowers, fruits, furniture, games, geography, geology, greetings, holidays, horoscope, human body, insects, instruments, jargons, machines, materials, mathematics, media, military, movies, music, nations, numbers, occupations, people, peoples, physics, planets, plants, relatives and family, religions, shapes, signs, space, sports, symbols, titles, tools, toys, transportation, and/or weather. In each of the four 13-card suit, each of the first 12 cards contains a term, phrase, or sentence plus related information (i.e., pronunciation, usage, synonyms, etc.) in the language or picture representing that suit. The 13th card contains a summary of the 12 terms, phrases, or sentences, plus cultural and/or other information about the topic, in the appropriate language or picture representation. One "joker" contains the topic itself in the three languages (and a pictorial representation); the other "joker" summarizes the three language vocabularies (and pictures). Cards with the same index contain language or pictorial representation of the same meaning. Some aspects of the invention relate to a playing card deck comprising plural suits represented by a plurality of languages and pictorial representation, for example, 2–21 suits to be played by at least one people. Furthermore, all suits comprise the same plurality of cards, for example, 2 to 13 or more cards, depending on the number of content possibilities that are included.

The present invention provides an apparatus comprising a deck of playing cards containing a plurality of suits with at least one suit represented by language style, all suits in said deck containing the same plurality of cards, each suit being identified by a symbol or icon thereon for its particular style, the style symbol or icon being exactly the same on each card within each suit, each card within a suit carrying at least one different and unique index thereon that represents its order within the suit, each and every card within a suit having exactly one matching card with identical index and identical meaning(s) of content, i.e., meaning(s) of language or other representation, in each other suit, each and every card within a language-style suit including thereon one or more characters, words, phrases, and/or sentences in that particular language as its content.

FIG. 1 shows one embodiment of a deck 11 of playing cards with three suits 12, 13, 14 representing three different language styles: English 15, Chinese 16, and Japanese 17 styles. As an illustration of language-related information being part of the card contents for language learning, pronunciation, which means for speaking the particular language representation as shown on each card, is also included, for example, English pronunciation for rat 15A, Chinese pronunciation for rat 16A, and Japanese pronunciation for rat 17A. In one embodiment, each suit has the same number of 13 cards, which are identified from a number of 1 to 13. In a particular embodiment, each card index associates with a corresponding Chinese zodiac animal, and card no. 13 includes all twelve animals in the Chinese zodiac. The traditional Chinese zodiac 18 includes 12 animals in the order of: rat (also known as mouse), cow (also known as ox), tiger, rabbit (also known as hare), dragon, snake (also known as serpent), horse, goat (also known as sheep or ram), monkey, rooster, dog and pig (also known as boar). The player(s) can learn what these animals are called in foreign languages through playing card games. The signs of the zodiac can also be used in the playing cards of the invention, i.e., Aries, Taurus, Gemini, Cancer, Leo, Virgo, Libra, Scorpio, Sagittarius, Capricorn, Aquarius, and Pisces. In a broad aspect of the invention, the playing card deck may comprise plural suits represented by a plurality of languages and pictorial representation, for example, 2–21 suits to be played by at least one people. Furthermore, all suits comprise the same plurality of cards, for example, 2 to 13 or more cards, depending on the number of content possibilities that are included.

Figure 2:
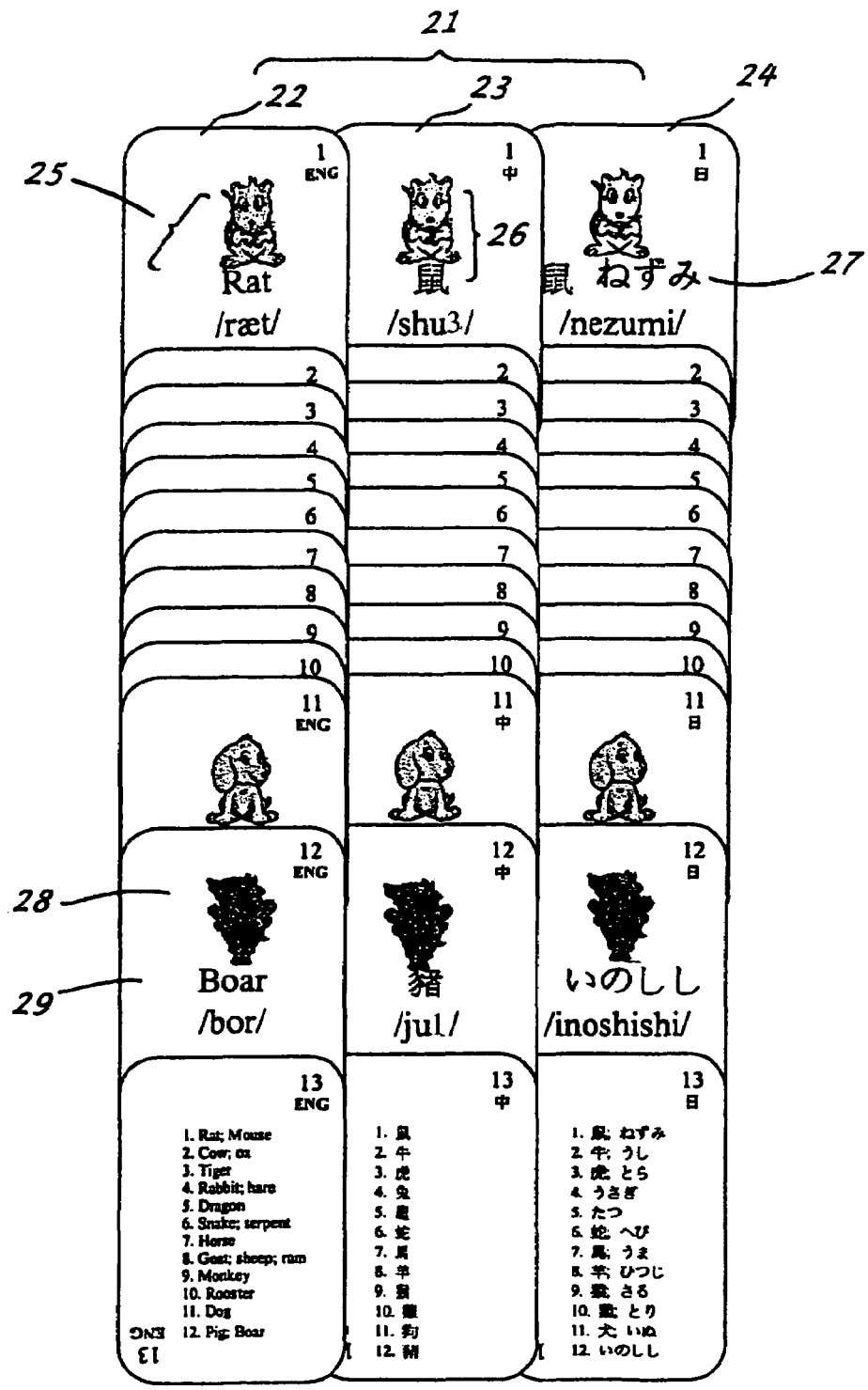
FIG. 2 shows one embodiment of a deck of playing cards with three suits represented by three different picture-language styles: picture-English, picture-Chinese, and picture-Japanese styles.

FIG. 2 shows one embodiment of a deck 21 of playing cards with three suits 22, 23, 24 representing three different picture-language styles: picture-English 25, picture-Chinese 26, and picture-Japanese 27 styles. By way of example, the picture-English card no. 12 includes a picture of pig 28 and an English representation of "pig" 29 corresponding to that picture 28 on the card. In one embodiment, each suit has the same number of 13 cards, which are identified from a number of 1 to 13. In a broad aspect of the invention, the playing card deck may comprise plural suits and each suit may comprise plural cards.

Figure 3:
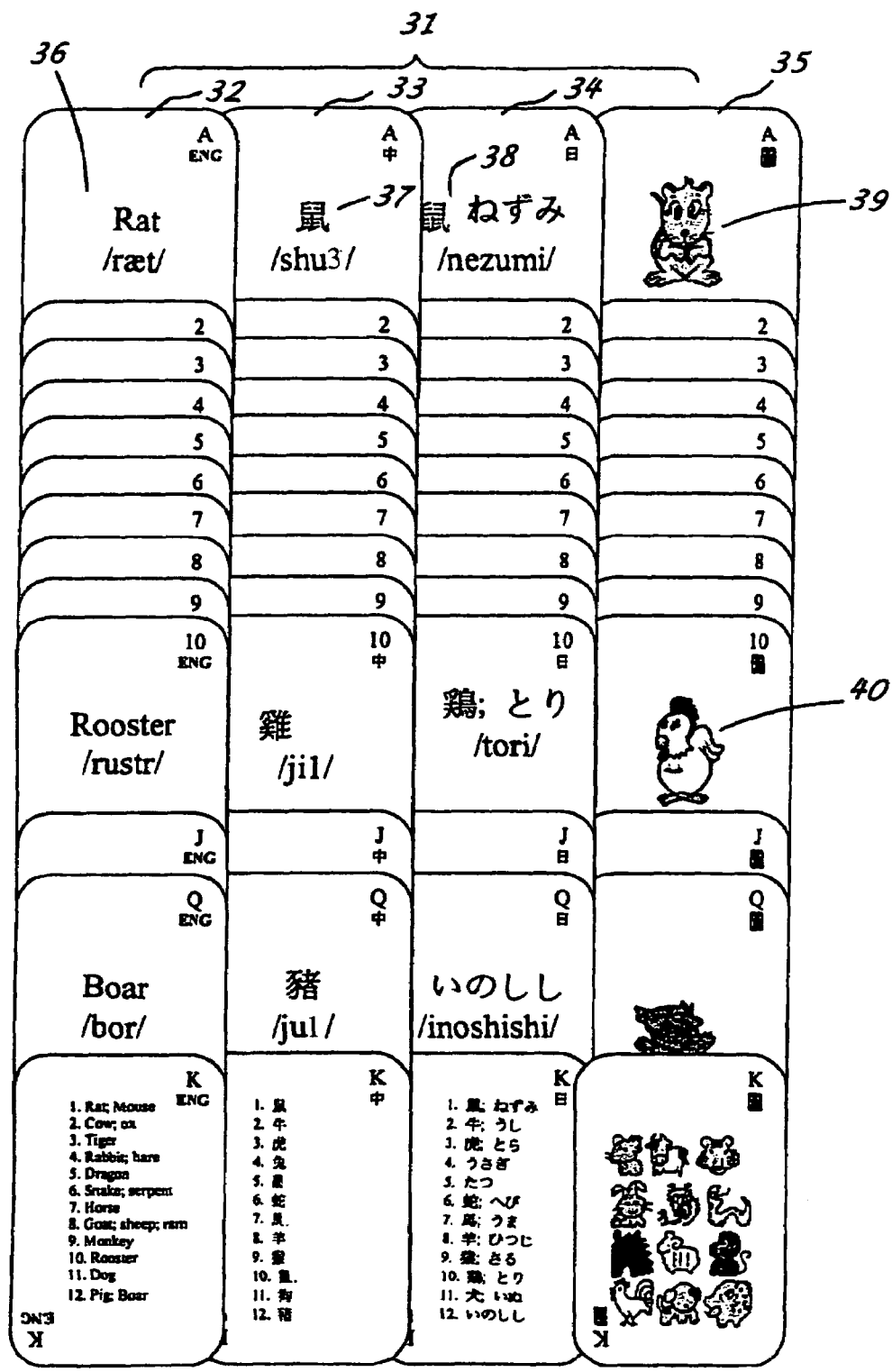
FIG. 3 shows one embodiment of a deck of playing cards with four suits that are represented by three different language styles and one picture style: English, Chinese, Japanese and picture styles.

FIG. 3 shows one embodiment of a deck 31 of playing cards with four suits 32, 33, 34, 35 that are represented by three different language styles and one picture style: English 36, Chinese 37, Japanese 38, and picture 39 styles, respectively. The cards with the same index share the same meaning of content; for example, cards no. 10 in English suit 32, Chinese suit 33 and Japanese suit 34 all have language representation of "rooster," corresponding to the picture of a rooster 40 in the 10th card in the picture suit 35. The indices in this example are the same as in conventional poker cards.

Figure 4:
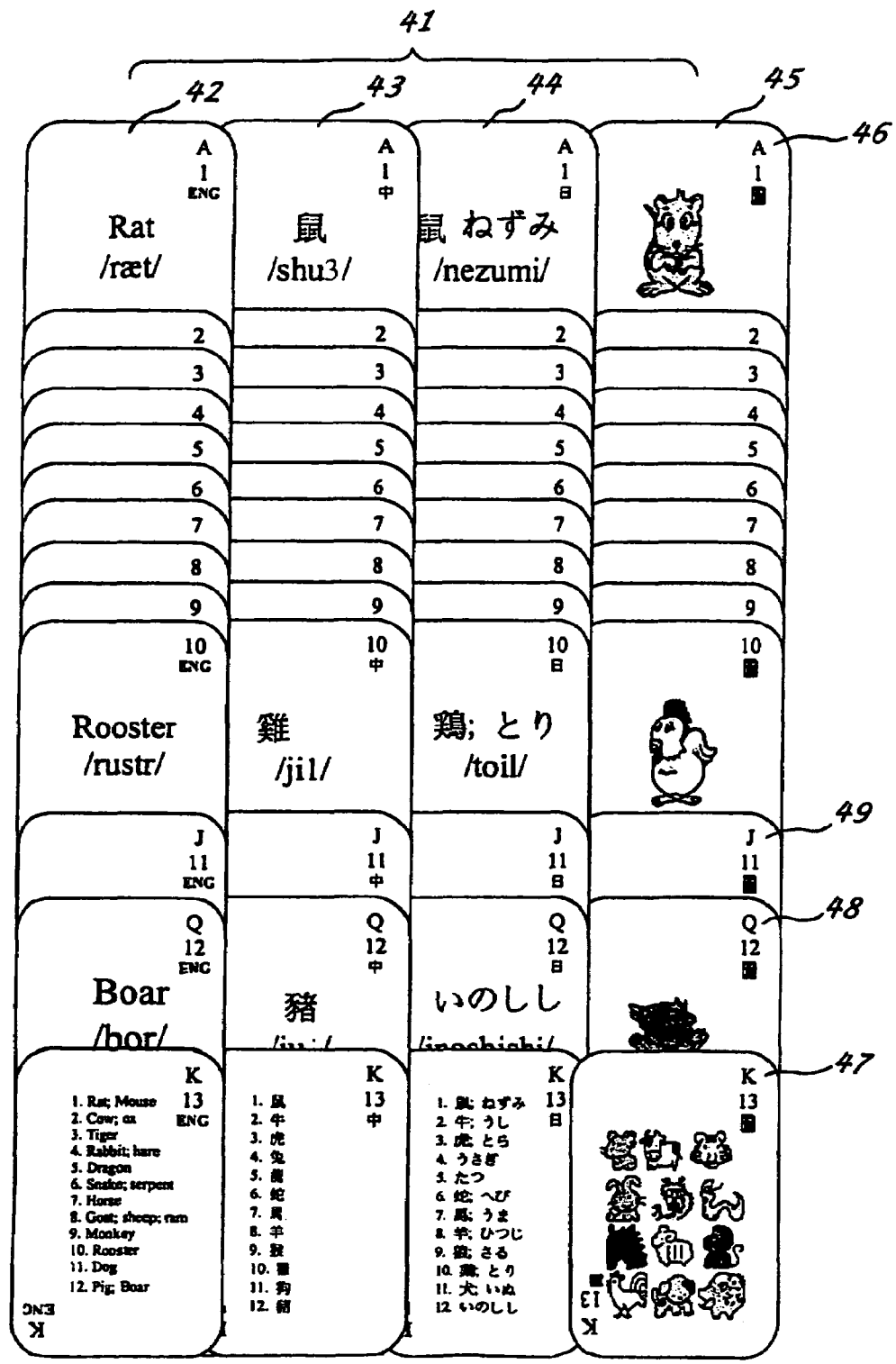
FIG. 4 shows one embodiment of a deck of playing cards with four suits that are represented by three different language styles and one picture style, wherein numerical indices are also used for A, K, Q, and J cards.

FIG. 4 shows one embodiment of a deck 41 of playing cards with four suits 42, 43, 44, 45 that are represented by three different language styles and one picture style, respectively, wherein alphanumerical indices are also used for A 46, K 47, Q 48, and J 49 cards for easy identification.

In one embodiment, the deck of playing cards includes at least one "joker" card, the joker card(s) being unique in the deck and not belonging to any suit. It is one object of the invention to provide a deck of playing cards that includes a "topic" card containing a description of the topic associated with the deck, the card being unique in the deck and not belonging to any suit. It is another object of the invention to provide a deck of playing cards that includes an "information" card containing information related to the language or pictures in the deck, the card being unique in the deck and not belonging to any suit. The "information" card can be labeled such as to be descriptive of the nature of the information, e.g., "story" for cards related to the zodiac, "culture comparison" for cards related to greetings, and "distribution of habitats" for cards related to animals. It is still another object of the invention to provide a deck of playing cards that includes a "summary" card containing a summary of the language or pictures in the deck, the card being unique in the deck and not belonging to any suit. A card that is unique in the deck and does not belong to any suit can play the roles of a joker card in a card game.

Figure 5:
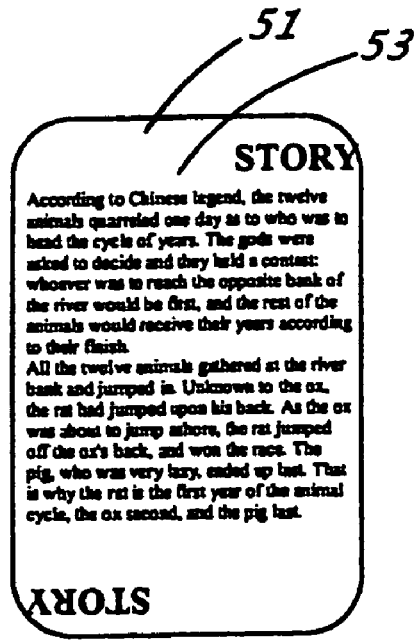
FIG. 5 shows one embodiment of a deck of playing cards (not shown) with additional cards that do not belong to any of the suits and can play the roles of jokers.
Figure 5:
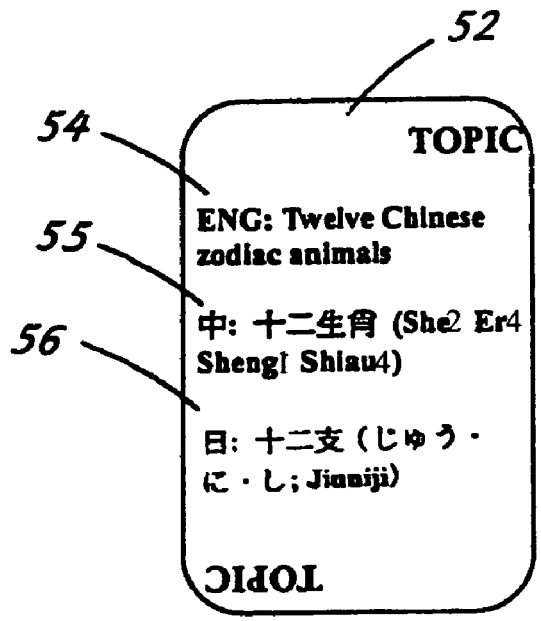

FIG. 5 shows one embodiment of a deck of playing cards (not shown) with additional cards 51, 52 that do not belong to any of the suits and can play the roles of joker cards. By way of example, a first card 51 states a story 53 of the Twelve Chinese zodiac animals in English while a second card 52 shows the topic, such as "Twelve Chinese zodiac animals" in English 54, in Chinese 55 and in Japanese 56. Other relevant information in text and/or in picture may also be used for any of the additional cards 51, 52.

Figure 6:
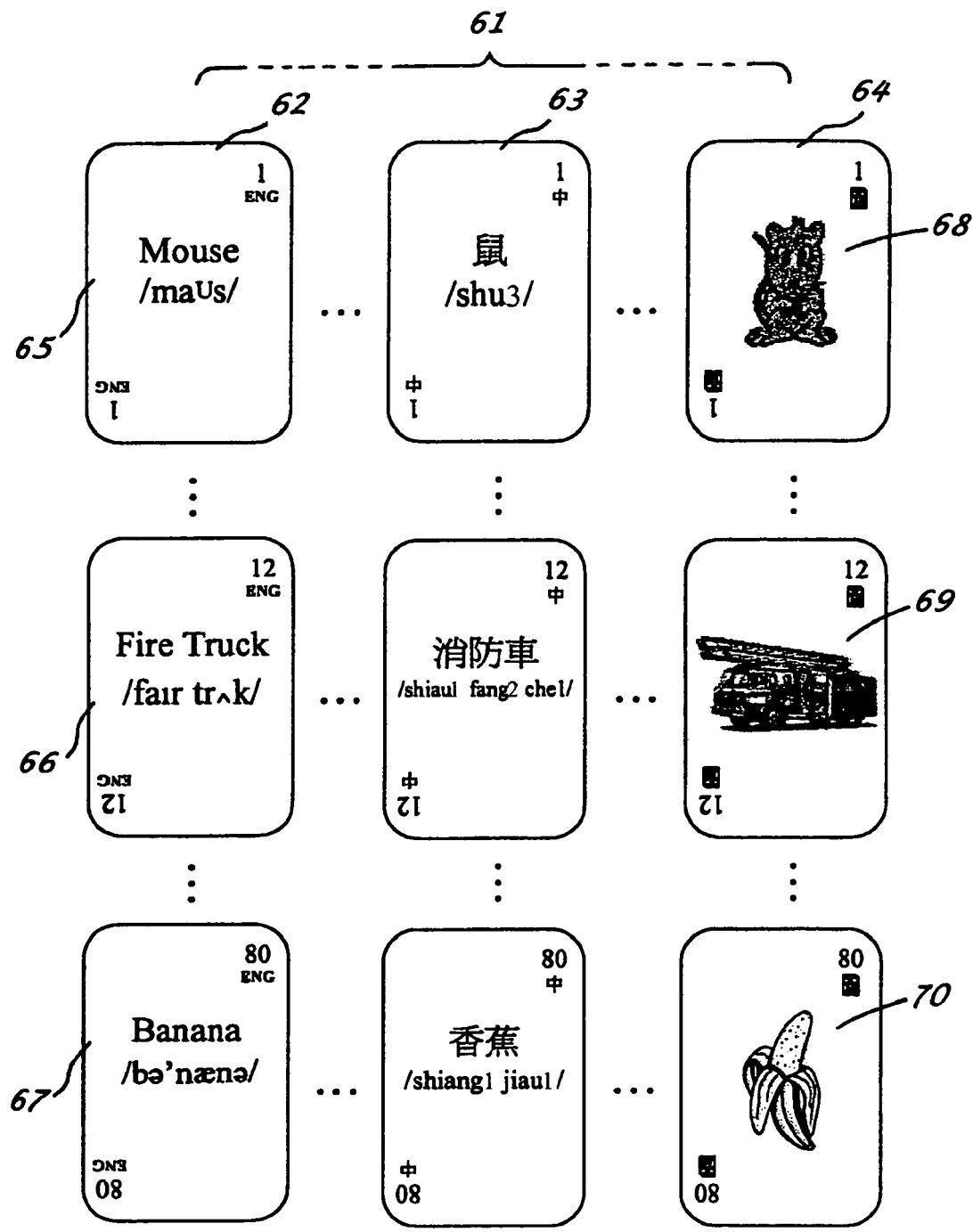
FIG. 6 shows one embodiment of a deck of playing cards with a plurality of suits, and in the suits same plurality of cards.

FIG. 6 shows one embodiment of a deck 61 of playing cards with a plurality of suits exemplified by 62, 63, 64, and in all suits the same plurality of cards exemplified by 65, 66, 67. The players may pick a few suits and the same range of cards in each selected suit to play. By way of example, the language styles may include any of English, Chinese, Japanese, French, Germany, Spanish, Italian, Greek, Danish, Dutch, Russian, Portuguese, Korean, Thai, Vietnamese, Indonesian, Hebrew, Arabic, Swedish, and Finnish. Among them, one language can be designated as the players' primary language, for example, English. The picture style is the corresponding pictorial, symbolical, graphical, image, and/ or animation (as in an electronic embodiment) representation of the vocabulary, phrases, and sentences of the language style(s). In this example, the pictures of mouse 68, fire truck 69, and banana 70 correspond to the language representations on the cards with matching indices. The language and picture styles may represent vocabulary, phrases, and/or sentences which are related to academic disciplines, animals, architecture, arts, astrology, astronomy, buildings, businesses, cartoon characters, chemistry, the Chinese zodiac, clothing, conversation, culture, electronics, engineering, entertainment, equipment, facilities, fashion, feelings, festivals, fishes, foods, flowers, fruits, furniture, games, geography, geology, greetings, holidays, horoscope, human body, insects, instruments, jargons, laws and regulations, machines, materials, mathematics, media, military, movies, music, nations, numbers, occupations, people, peoples, physics, planets, plants, politics, relatives and family, religions, shapes, signs, space, sports, symbols, titles, tools, toys, transportation, and/or weather.

Figure 7:
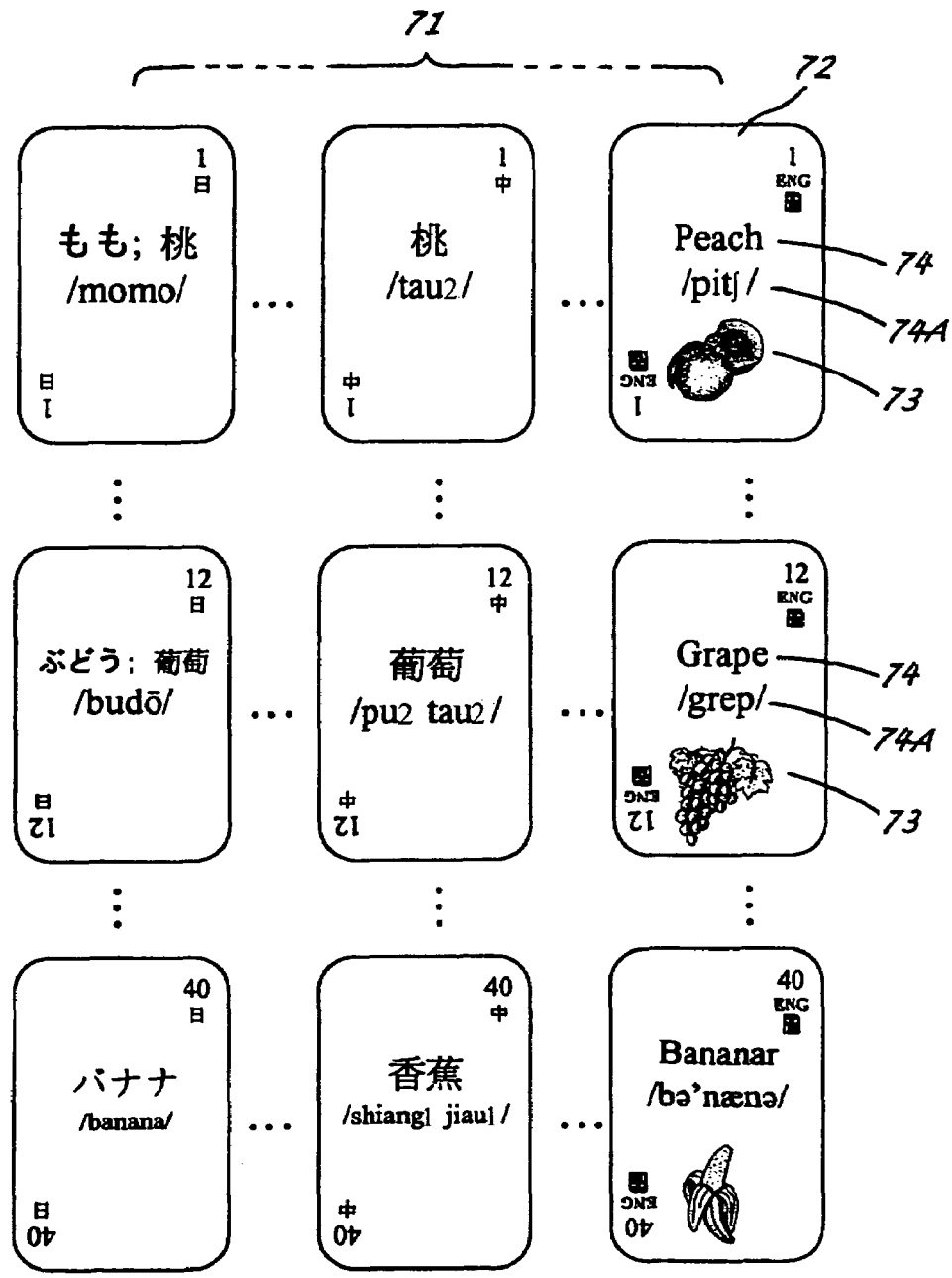
FIG. 7 shows one embodiment of a deck of playing cards with one suit containing both pictures and the players' primary (or native) language.

FIG. 7 shows one embodiment of a deck 71 of playing cards with one suit 72 containing both pictures 73 and the players' primary (or native) language 74. As an illustration of language-related information being part of the card contents for language learning, pronunciation, which means for speaking the languages as shown on each card is also included, for example, English pronunciation 74A under the English language representation 74. The primary language may be selected from a group consisting of English, Chinese, Japanese, French, Germany, Spanish, Italian, Greek, Danish, Dutch, Russian, Portuguese, Korean, Thai, Vietnamese, Indonesian, Hebrew, Arabic, Swedish, and Finnish.

Figure 8:
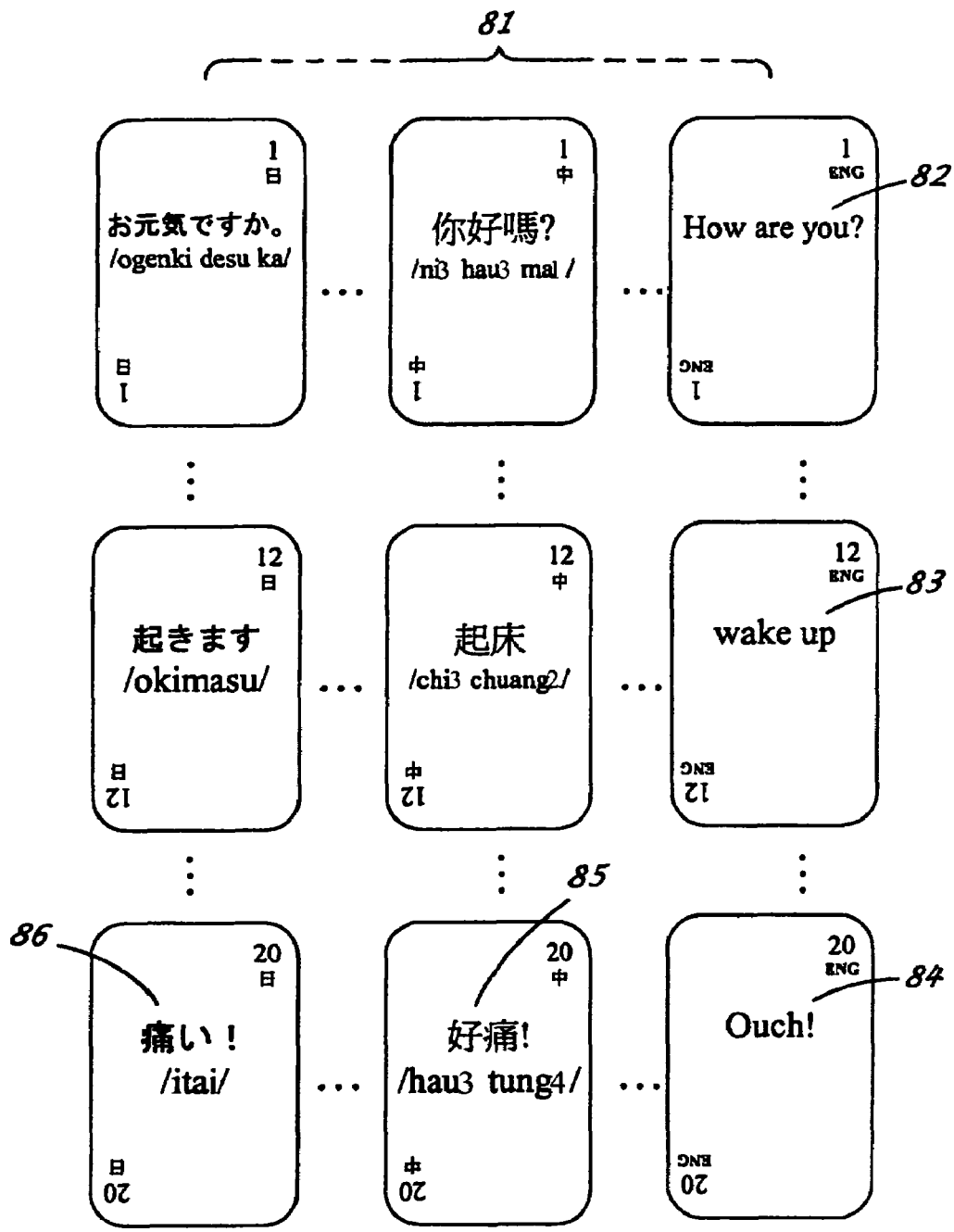
FIG. 8 shows one embodiment of a deck of playing cards that includes thereon words, phrases, and sentences—as language representation.

FIG. 8 shows one embodiment of a deck 81 of playing cards with language style including words (for example, "ouch" 84), phrases (for example, "wake up" 83), sentences (for example, "how are you?" 82), and/or the like in one or more suits. The different language styles may include English 84, Chinese 85, or Japanese 86. With the help of the indices and matching cards, the players can learn vocabulary, phrases, and sentences in foreign languages through playing card games.

Under game rules where one suit, e.g. English language suit, has more value than another suit, i.e. Japanese language suit, card no. 7 of English language suit may have more value than card no. 7 of Japanese language suit. The relative value of any suit over the other suits can be pre-determined by the players. It is easy to visualize that using the different card quantity and suit values, many different games can be played. In one aspect, the playing card deck can be a virtual system that can be played on and/or through one or more electronic devices.

A deck of playing cards of the invention can be used to play games for both educational and entertainment purposes, for example, a game called Bluffing. Bluffing: players equally and randomly share the deck cards; each player takes turn to unload his/her cards having or bluffed to have one identical index; the unloaded cards are covered until being challenged; the next player can (1) unload cards with or without bluffing, (2) challenge the cards unloaded by the previous player, or (3) skip a turn; if the challenge were successful, the previous player (who was bluffed and challenged) would need to take in all the cards on the table (unloaded previously); if the challenge were invalid, the challenger would need to take in all the cards; the player that is the first to successfully unload all his/her cards wins the game. Using the playing cards of the invention, the person with better language capability would be more convincing in bluffing by describing the contents of cards in different languages.

From the foregoing description, it should now be appreciated that an apparatus comprising a deck of playing cards with language (and picture) suits for learning a foreign language(s) has been disclosed. While the invention has been described with reference to a specific embodiment, the description is illustrative of the invention and is not to be construed as limiting the invention. Various modifications and applications may occur to those who are skilled in the art, without departing from the true spirit and scope of the invention, as described by the appended claims.

What is claimed is:

1. A deck of cards comprising:
   (a) a first-language suit comprising a plurality of first-language cards, each first-language card comprising one or more first-language words, phrases, or sentences in a first language, a first icon indicating the first-language suit, and an index; and
   (b) a second-language suit comprising a plurality of second-language cards, each second-language card comprising one or more second-language words, phrases, or sentences in a second language that is different from the first language, a second icon indicating the second-language suit, and an index;
   wherein each first-language card having exactly one corresponding second-language card, which comprises the same index and at least one word, phrase, or sentence of the one or more second-language words, phrases, or sentences being a translation of the one or more first-language words, phrases, or sentences of the first-language card.

2. The deck of cards of claim 1, further comprising a picture suit comprising a plurality of picture cards, each picture card comprising one or more pictures, figures, graphs, images, or animations and an index;
   each first-language card having exactly one corresponding picture card, which comprises the same index and at least one picture, figure, graph, image, or animation of the one or more pictures, figures, graphs, images, or animations being an illustration of the one or more first-language words, phrases, or sentences of the first-language card.

3. The deck of cards of claim 2, further comprising a third-language suit comprising a plurality of third-language cards, each third-language card comprising one or more third-language words, phrases, or sentences in a third language that is different from the first language and the second language, a third icon indicating the third-language suit, and an index;
   each first-language card having exactly one corresponding third-language card, which comprises the same index and at least one word, phrase, or sentence of the one or more third-language words, phrases, or sentences being a translation of the one or more first-language words, phrases, or sentences of the first-language card.

4. The deck of cards of claim 1, wherein the first language is selected from a group consisting of English, Chinese, Japanese, French, Germany, Spanish, Italian, Greek, Danish, Dutch, Russian, Portuguese, Korean, Thai, Vietnamese, Indonesian, Hebrew, Arabic, Swedish, and Finnish.

5. The deck of cards of claim 1, wherein the second language is selected from a group consisting of English, Chinese, Japanese, French, Germany, Spanish, Italian, Greek, Danish, Dutch, Russian, Portuguese, Korean, Thai, Vietnamese, Indonesian, Hebrew, Arabic, Swedish, and Finnish.

6. The deck of cards of claim 1, further comprising a third-language suit comprising a plurality of third-language cards, each third-language card comprising one or more third-language words, phrases, or sentences, wherein said third language is different from the first language and the second language, a third icon indicating the third-language suit, and an index;

each first-language card having exactly one corresponding third-language card, which comprises the same index and at least one word, phrase, or sentence of the one or more third-language words, phrases, or sentences being a translation of the one or more first-language words, phrases, or sentences of the first-language card.

7. The deck of cards of claim 6, wherein the third language is selected from a group consisting of English, Chinese, Japanese, French, Germany, Spanish, Italian, Greek, Danish, Dutch, Russian, Portuguese, Korean, Thai, Vietnamese, Indonesian, Hebrew, Arabic, Swedish, and Finnish.

8. The deck of cards of claim 6 wherein at least one third-language card further comprises one or more pictures, figures, graphs, images, or animations, wherein said one or more pictures, figures, graphs, images, or animations are an illustration of the one or more first-language words, phrases, or sentences of at least one third-language card.

9. The deck of cards of claim 1 wherein at least one first-language card further comprises one or more pictures, figures, graphs, images, or animations, wherein said one or more pictures, figures, graphs, images, or animations are an illustration of the one or more first-language words, phrases, or sentences of the at least one first-language card.

10. The deck of cards of claim 1 wherein at least one second-language card further comprises one or more pictures, figures, graphs, images, or animations, wherein said one or more pictures, figures, graphs, images, or animations are an illustration of the one or more first-language words, phrases, or sentences of the at least one second-language card.

11. The deck of cards of claim 1 wherein each said index comprises at least one alphanumeric character.

12. The deck of cards of claim 1 wherein each said index comprises at least one number.

13. The deck of cards of claim 1 wherein each said index is selected from a group consisting of 2, 3, 4, 5, 6, 7, 8, 9, 10, 11, 12, 13, J, Q, K, and A.

14. The deck of cards of claim 1 wherein the first-language suit consists of 13 cards.

15. The deck of cards of claim 1 wherein the first-language suit comprises a summarizing card, wherein the one or more first-language words, phrases, or sentences summarize the one or more first-language words, phrases, or sentences on other cards in the first-language suit.

16. A deck of cards comprising a plurality of suits; wherein each suit comprises a number of cards wherein each card comprises an icon, an index, and a word, phrase, or sentence;

wherein each word, phrase, or sentence is in a language and has a meaning;

wherein there is a plurality of languages in said deck;

wherein said number of cards in each suit is equal to the number of cards in every other suit;

wherein said language of said word, phrase, or sentence of each card of the same suit is the same language;

wherein said icon of each card of the same suit is the same icon;

wherein said language of each suit is different from said language in every other suit; and wherein said meaning of said word, phrase, or sentence of each card has a corresponding card with the same index with a word, phrase, or sentence of said same meaning in every other suit.

17. A deck of cards comprising:

(a) a language suit comprising a plurality of language cards, each language card comprising one or more words, phrases, or sentences in a language and an index; and (b) a picture suit comprising a plurality of picture cards, each picture card comprising one or more pictures, figures, graphs, images, or animations and an index;

wherein each language card has exactly one corresponding picture card, which comprises the same index and at least one picture, figure, graph, image, or animation of the one or more pictures, figures, graphs, images, or animations being an illustration of the one or more words, phrases, or sentences of the language card.

18. The deck of cards of claim 17 wherein each picture card further comprises a unique icon that indicates the picture suit.

* * * * *